United States Patent [19]

Hashimoto

[11] Patent Number: 4,958,366

[45] Date of Patent: Sep. 18, 1990

[54] TELEPHONE ANSWERING METHOD AND DEVICE PROVIDING OUTGOING MESSAGE IN A SELECTED LANGUAGE

[75] Inventor: Kazuo Hashimoto, Tokyo, Japan

[73] Assignee: Hashimoto Corporation, Tokyo, Japan

[21] Appl. No.: 235,738

[22] Filed: Aug. 22, 1988

[30] Foreign Application Priority Data

Aug. 21, 1987 [JP] Japan .............................. 62-207774

[51] Int. Cl.⁵ ........................................... H04M 1/65
[52] U.S. Cl. ........................................ 379/74; 379/70;
379/77; 364/900; 364/920.4; 364/919.4
[58] Field of Search ...................... 364/513.5, 419, 900;
381/42–43, 51–53; 379/67, 70, 72, 74, 77, 84, 88

[56] References Cited

U.S. PATENT DOCUMENTS

| | | | |
|---|---|---|---|
| 4,071,698 | 1/1978 | Barger, Jr. et al. | 379/84 |
| 4,122,306 | 10/1978 | Friedman et al. | 379/77 |
| 4,359,607 | 11/1982 | Hannig et al. | 379/70 |
| 4,488,005 | 12/1984 | Frantz | 379/88 |
| 4,502,128 | 2/1985 | Okajima et al. | 364/900 |
| 4,507,750 | 3/1985 | Frantz et al. | 364/900 |

*Primary Examiner*—Stuart S. Levy
*Assistant Examiner*—James E. Tomassini
*Attorney, Agent, or Firm*—Lowe, Price, LeBlanc, Becker & Shur

[57] ABSTRACT

A telephone answering device wherein an outgoing message translated from an original language into each of several different foreign languages is sent out in a predetermined order to a calling party of any foreign country when he pushes ten-keys on a push-button telephone in a predetermined order, so that the calling party can get the most understandable outgoing message. The outgoing messages translated into major foreign languages are previously stored depending on the country's language situation, or otherwise the prerecorded original outgoing message is translated into one of the foreign languages by a built-in translating device each time the calling party pushes a ten-key, to be delivered to the calling party.

3 Claims, 3 Drawing Sheets

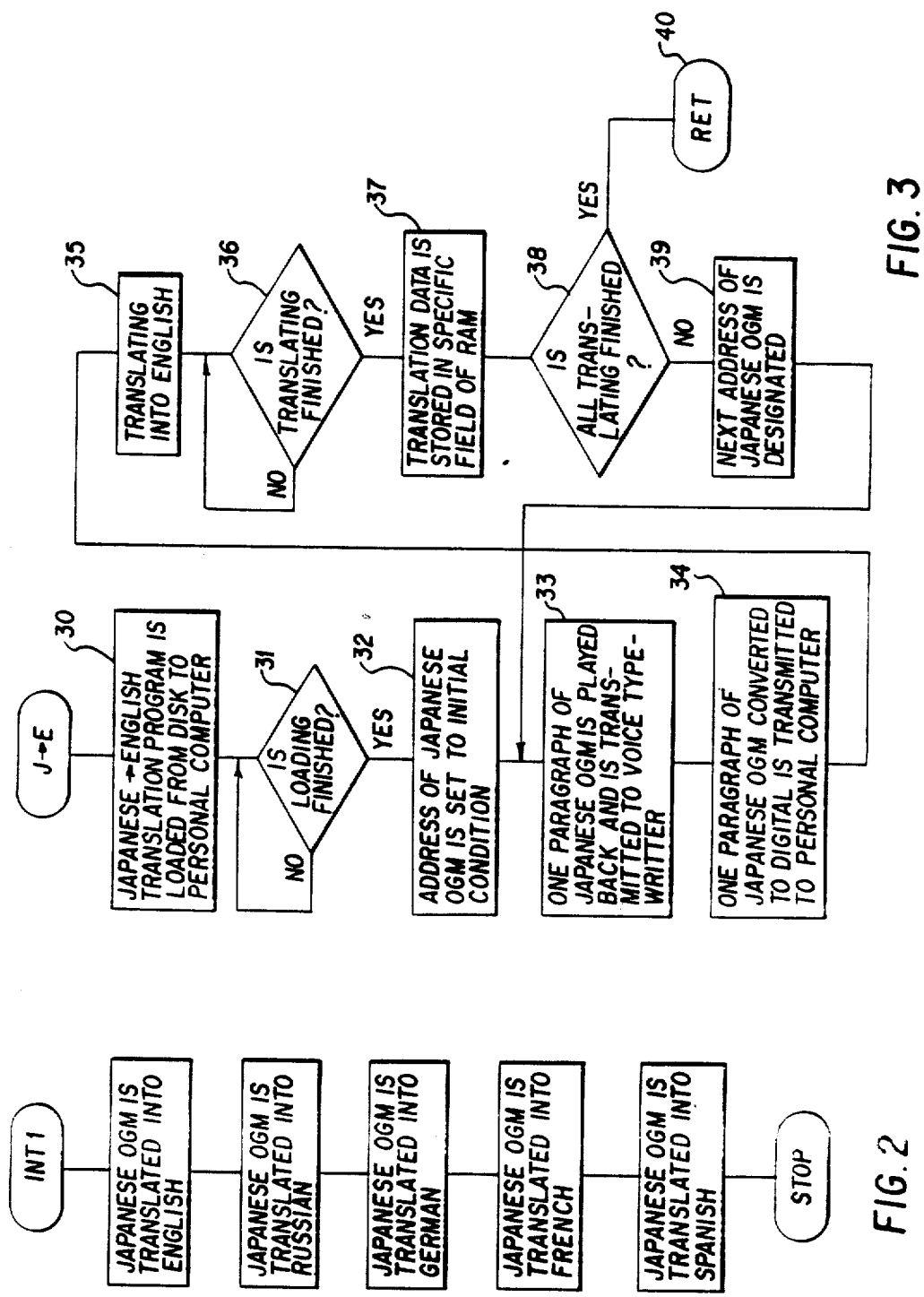

TELEPHONE ANSWERING METHOD AND DEVICE PROVIDING OUTGOING MESSAGE IN A SELECTED LANGUAGE

BACKGROUND OF THE INVENTION

The present invention relates to a telephone answering device.

In conventional telephone answering devices, only an outgoing message in an original language is prerecorded to be sent out to a calling party. Thus, it is not useful for a foreigner in case of world-wide direct calling, because he cannot understand the prerecorded outgoing message and he cannot know what kind of suitable message he should leave.

SUMMARY OF THE INVENTION

It is an object of the present invention to provide a telephone answering device wherein an outgoing message translated into each of several foreign languages is sent out to a calling party in order of, for instance, English, Russian, German, French, Spanish or the like, in response to a calling party's operation of ten-keys, 1, 2, 3 ... of a push-button telephone, so as to enable the calling party of any foreign country to understand the outgoing message in case of a world-wide direct call. According to the present invention, it is arranged that each of the outgoing messages translated from an original language into foreign languages is previously stored in a predetermined order according to the local language situation, or any prerecorded original outgoing message is translated into one of the foreign languages by a built-in translating device each time the calling party pushes a ten-key, to be sent out to the calling party.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a flow chart which shows a main routine of the first preferred embodiment.

FIG. 3 is a flow chart which shows a subroutine of the first preferred embodiment.

DESCRIPTION OF THE PREFERRED EMBODIMENTS

The detailed description of the preferred embodiments according to the present invention will be now described with reference to the accompanying drawings.

Figure 1:
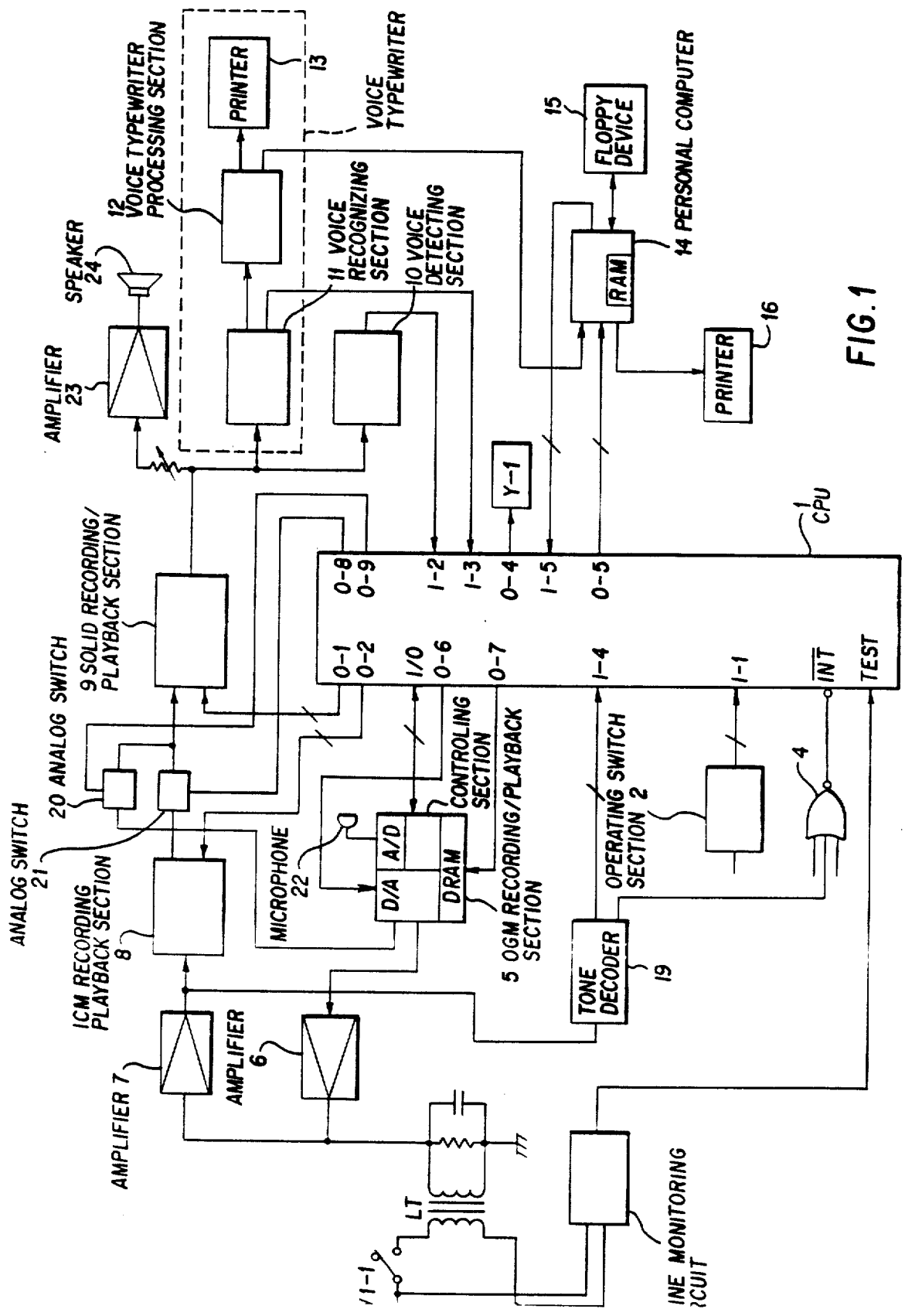
FIG. 1 is a block diagram of a first preferred embodiment of the invention.

Referring to FIG. 1, reference numeral 1 denotes a one-chip microprocessor (CPU). In the one-chip microprocessor 1, reference symbol INT denotes an interrupt terminal, reference symbol I/O-1 denotes an input terminal, reference symbols O-1–O-7 denote output terminals, reference symbol I-1–I-5 denote input terminals and reference symbol TEST-1 denotes an input terminal. Reference numeral 2 is an operating switch section which has a recording playback switch of an outgoing message (OGM), a rewinding switch and playback switch of a tape on which an incoming message (ICM) from a caller is recorded, and various operating switches by which this device is set to an automatic answering recording mode, etc. Reference numeral 3 denotes a line monitoring circuit for detecting a calling signal and an on-hook operation of a caller. Reference numeral 4 denotes an NOR gate for conducting an output from the operating switch section 2, an output from the line monitoring circuit 3, and an output from a tone decoder 19 which will be explained later, to the interrupt terminal INT of the CPU. Reference numeral 5 denotes an OGM recording/playback section.

In this embodiment, a known LSI is used in the OGM recording/playback section, which is made of an A/D converter, a dynamic random access memory (DRAM), and a control section.

Reference numerals 6 and 7 denote amplifiers. Reference numeral 8 denotes an ICM recording/playback section. A recording tape is used in this embodiment to record for a long time Reference numeral 9 denotes a solid recording/playback section.

In the invention of Japanese patent application No. 61-313325, which has been filed in Japan prior to filing of the present application, all the messages from a caller by one call are transmitted to the solid recording/playback section 9 from the tape. The solid recording/playback section 9 is used for translating automatically a message in different foreign languages into one in a mother tongue by the personal computer which will be explained later, in an operating condition or a waiting condition by the telephone answering device The solid recording/playback section 9 of this application also uses a common circuit and means of the above application to send the outgoing message translated from Japanese into English, for example, by operating a push-button telephone by the caller.

Reference numeral 10 denotes a voice detecting section. The voice detecting section 10 detects a pause of the message played back from the solid recording/playback section 9, and inputs one paragraph of the played back message to a voice recognizing section 11. When voice recognizing of one paragraph is finished, the next one paragraph of the message is input to the voice recognizing section 11.

Reference numeral 12 denotes a voice typewriter processing section. The voice typewriter processing section 12 encodes one paragraph of the message that voice recognizing is done to the specific code, and inputs the code to a printer 13 and a personal computer 14 as above (if it is an outgoing message, it is not always necessary that the outgoing message is output to the printer).

When a tone decoder 19 decodes a DTMF tone of the push-button telephone sent from the caller, the personal computer 14 starts to translate the outgoing message transmitted to the solid recording/playback section 9 as above into the specific foreign language. Alternatively, the personal computer 14 outputs a corresponding translation in the many foreign languages which have already been translated. The translation program of each foreign language is stored in a disk (not shown in the FIG. 1) for a floppy device 15, and the corresponding translation program is transmitted to a RAM (not shown in the FIG. 1) in the personal computer 14, and is used.

Reference numerals 20 and 21 denote analog switches. First, the key "OGM-REC" (not shown in FIG. 1) on the operating switching section 2 shown in FIG. 1 is pushed in order to record a Japanese OGM (outgoing message) The interrupt operation is done to the CPU 1 by pushing the key "OGM-REC" through the NOR gate 4, and as a result, the program jumps to the program for recording the outgoing message (not shown in the drawings). The OGM recording/playback section 5 is set to the recording condition and is started by the order of the program from the input/output port I/O-1 through the control section shown in FIG. 1. At this time, the outgoing message voice input by using a microphone is converted to the digital signal by the A/D converter, and is recorded in the DRAM.

When recording of the outgoing message is finished, the recording condition is released by pushing the stop key (not shown in the drawings) on the operating switch section.

The operation to translate automatically the outgoing message (OGM) recorded by Japanese as above into each foreign language, for example, English, Russian, German, French, and Spanish, etc. will be explained referring to the flow chart shown in FIG. 2 and FIG. 3. First, when an automatic translation key (not shown in the drawings) on the operating switch section 2 is pushed, the program jumps to a main routine shown in FIG. 2 by the interrupt. This main routine translates the OGM in Japanese to the OGM in English; thereafter, the main routine translates continuously the OGM in Japanese into the OGM is Russian, into the OGM in German, and into the OGM in French. Finally, when the OGM in Japanese is translated into the OGM in Spanish, the processing of automatic translation by the main routine is finished.

FIG. 3 shows a subroutine for translating automatically the OGM in Japanese into the OGM in English. In step 30, the translation program for translating Japanese into English is loaded to the personal computer 14 from a disk (not shown in the drawings) in the floppy device 15 shown in FIG. 1. When loading is finished (step 31), the address of the DRAM in which the OGM in Japanese in the OGM recording/playback section 5 shown in FIG. 1 is recorded is set to the initial condition, and the program is set so that it is possible to play back the Japanese OGM from a head position of the Japanese OGM (step 32).

In step 33, the OGM recording/playback section 5 is started in a playback condition by an order from the input/output port I/O-1 of the CPU 1. Accordingly, the Japanese OGM recorded in the DRAM is converted from a digital signal to an analog signal by the D/A converter, and is transmitted to the voice typewriter through the analog switch 20 and the solid recording/playback section 9 which are set to ON by an order from the CPU 1. At this time, a pause of Japanese OGM is detected by operation of the voice detecting section 10, and one paragraph of the Japanese OGM, "This is Hashimoto Corporation." for example, is transmitted to the voice typewriter.

In step 34, after one paragraph of the Japanese OGM transmitted to the voice typewriter as above is voice-recognized by the voice recognizing section 11, the paragraph of the Japanese OGM is converted to a digital signal for translating by the voice typewriter processing section 12 and is transmitted to the personal computer 14.

In step 35, one paragraph of the Japanese OGM converted to the digital signal is translated by the translation program loaded from the disk. When the translation is finished, translated data are stored in the specific field of the RAM in the personal computer 14. In step 38, it is tested whether all translating is finished or not.

The control section in the OGM recording/playback section has already memorized an ending position of the Japanese OGM which has been already recorded and outputs the end signal at the end position of recording. Accordingly the above test can be practiced by detecting the end signal output at the end position of recording by the input/output port I/O-1. When all translating is not finished, after the next address of the Japanese OGM is designated in step 39, the program returns to step 33, and each paragraph of the Japanese OGM is translated in the step 33.

When all translating is finished, this routine is finished in step 40. Otherwise, a construction of the sentence translated by the program of automatic translation is reviewed, and also is amended to the translation which is close to native English. Then, the Japanese OGM is translated into Russian, German, French and Spanish, and these translations are stored in the RAM in the personal computer 14 without duplication.

The translated and corresponding OGM is output by designating a start address of each foreign language as follows. In FIG. 1, the program is arranged as follows. When the tone decoder 19 detects the "1" key of the push-button telephone sent from a caller, the OGM translated into English is output, and when the tone decoder 19 detects the "2" key of the push-button telephone sent from a caller, the OGM translated into Russian is output, etc. When the device receives the signal, the calling signal is detected by the line monitoring circuit 3 and the output from the line monitoring circuit 3 is input to the input terminal TEST 1 of the CPU 1. As a result, it is judged whether it is a calling signal or not.

When it is a calling signal, the relay Y-1 is kept in an operating condition through the output port O-4. The telephone line is closed through the line transformer by a point of contact y1-1 of the relay Y-1. Continuously, the OGM recording/playback section 5 is started in the playback condition by an order output through the input/output port I/O-1, and the recorded Japanese OGM is transmitted through the amplifier 6 and the line transformer LT.

If the caller who wants to hear the OGM translated into English, the caller pushes the "1" key of the push-button telephone which is discussed previously. The DTMF tone of "1" generated by the pushing is decoded by the tone decoder 19 through the line transformer LT and the amplifier 7. When the program judges that the DTMF tone is "1" of the push-button telephone through the input port I-4, the start address of the OGM in English stored in the RAM in the personal computer 14 is designated through the output port O-5. The OGM in English is input to the CPU 1 through the input port I-5, and is input to the D/A converter of the OGM recording/playback section through the output port O-6, and the OGM in English which is a digital signal is converted to an analog signal, is output, and is sent to the caller. The DRAM in which the OGM in Japanese is recorded is separated during outputting English OGM.

After the sending of English OGM is finished, and the message from the caller is recorded in the ICM recording/playback section, this device is restored to the waiting condition. Further, if the calling party wants to listen to the English OGM again, he pushes the "1" key on the keypad of the push-button telephone again. Then an interrupt request is supplied to the CPU through the tone decoder 19 and the NOR gate 4, so that the same English OGM can be sent out again.

The second preferred embodiment will be described referring to the flow chart of FIG. 4. The outgoing message (OGM) is sent by a receiving signal as above. When a caller is a foreigner, the played back outgoing message cannot be understood. Accordingly the foreigner pushes the specific key of the push-button telephone which is described previously. As a result, the DTMF tone generated by pushing the key is decoded by the tone decoder 19 through the line transformer LT and the amplifier 7, and a part of the output from the tone decoder 19 interrupts the CPU through the NOR gate 4. As a result, the program jumps to the flow chart shown in FIG. 4.

Figure 4:
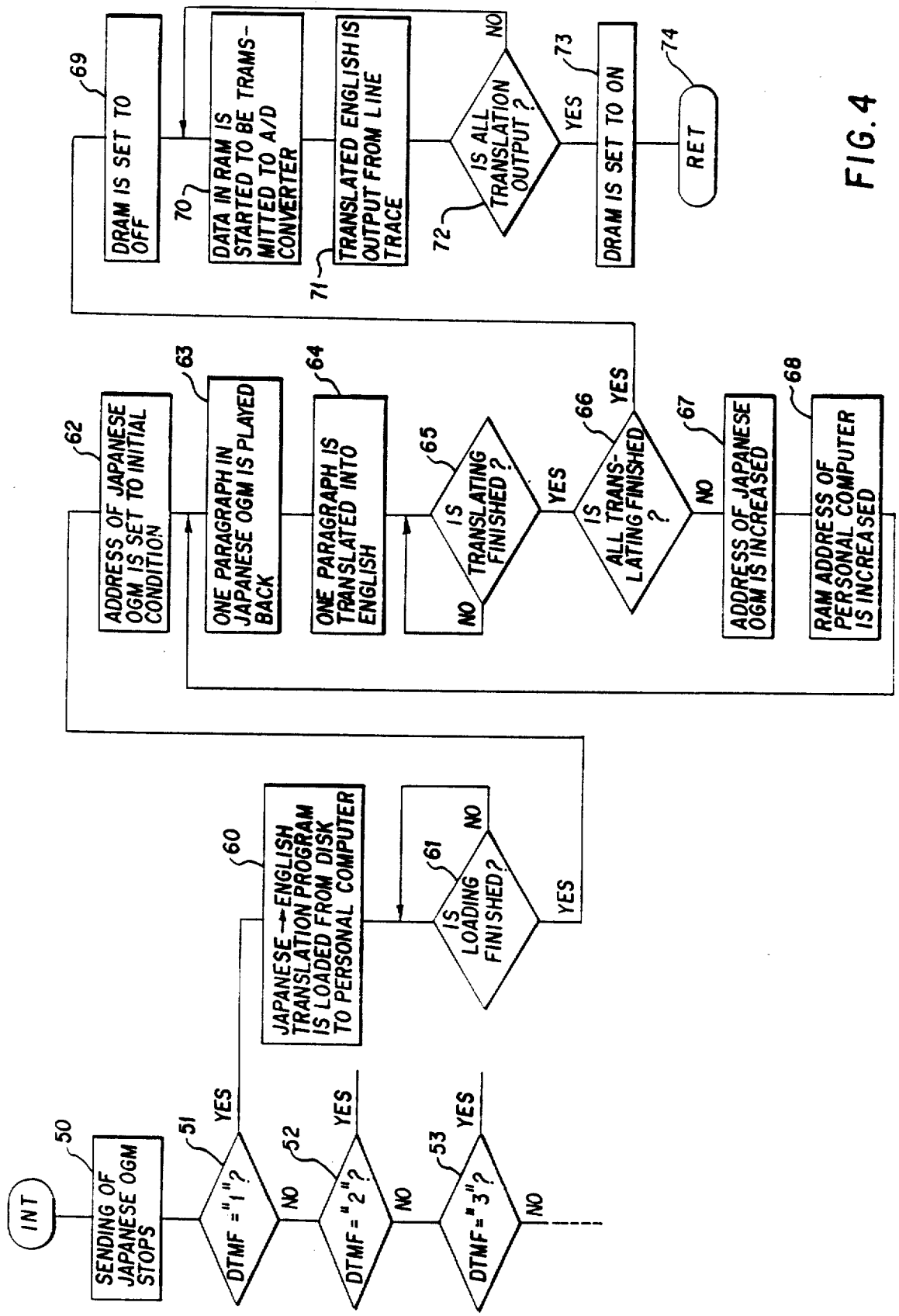
FIG. 4 is a flow chart which shows a routine of a second preferred embodiment

In FIG. 4, sending of Japanese outgoing message (OGM) is stopped in step 50. Namely, the OGM recording/playback section 5 is stopped by the order from the input/output port I/O-1 in FIG. 1. In step 51, when the DTMF tone corresponds with the "1" key of the push-button telephone, it is necessary to output the outgoing message translated into English. Accordingly step 51 becomes affirmative, and the program shifts to the step 60. The output (4 bits) from the tone decoder 19 is input to the CPU 1 through the input port I-4.

In step 60, the program which translates Japanese into English is loaded to the RAM in the personal computer 14 from a disk in the floppy device 15. When loading the program for translating is finished (step 61), the program shifts to step 62. In step 62, after the address of the OGM recording/playback section 5 is set to the initial condition, one paragraph is played back the from leading portion of the Japanese outgoing message, and is transmitted to the recording/playback section 9 through the analog switch 20 (step 63), and also is output to the voice recognizing section 11, the voice typewriter processing section 12 and the personal computer 14 wherein automatic translation processing is done (step 64).

In step 65, it is tested whether a translation of one paragraph is finished on the program or not. In step 66, it is tested whether all translating is finished or not. When the answer of this test is negative, the program shifts to step 67. In step 67, an order for increasing the address of the DRAM in the OGM recording/playback section 5 is given. In step 68, the address of the RAM in the personal computer 14 is increased for keeping a field for one paragraph of the OGM which is transmitted next.

The program returns to step 63, and translating the next paragraph of the OGM is processed as above. This operation is repeated. In step 66, when all translating is finished, the program shifts to step 69. The DRAM becomes passive by the output from the output port O-7. The outgoing message (digital signal) translated into English in the RAM is converted to an analog signal by inputting the digital signal, which means the translated outgoing message, to the D/A converter in the OGM recording/playback section 5 through the input port I-5 and the output port of the CPU 1, and is transmitted to the caller through the amplifier 6 and line transformer LT (step 70-72).

After the message converted to an analog signal is sent to the caller, the program returns the DRAM to the active condition (step 73).

As the above explanation, the outgoing message of the automatic guidance device including a conventional telephone answering device has been restricted to only the language of the country where the device is used. As a result, when a caller is a foreigner, the foreigner has suffered inconvenience because the foreigner can not understand a foreign language. In this invention, the foreigner can hear the corresponding outgoing message translated into each foreign language by pushing randomly the "1", "2", "3", . . . key of the push-button telephone. Namely, the foreigner can hear the corresponding outgoing message translated into each foreign language by pushing the number of the corresponding outgoing message translated into the caller's mother tongue which is memorized once. As a result, it is possible to use such kinds of devices in the world without restricting the scope of the conventional telephone answering device or automatic guidance device to one country.

There has been a device which can record mutually Japanese and English, but this device is inconvenient because it causes loss of time. In this invention, once a caller memorizes the number of push-button telephone corresponding to the position of the translated and corresponding outgoing message, the caller can hear the translated and corresponded outgoing message that the caller wants by pushing the number memorized by the caller. Presently, it is possible to talk over the telephone by a dialing operation in the world; accordingly, the practical effect of this invention is increased.

Although certain preferred embodiments have been shown and described, it should be understood that many changes and modifications may be made therein without departing from the scope of the invention.

What is claimed is:

1. A telephone answering device adapted to be coupled to a telephone line and to a telephone and including means responsive to an incoming call for closing a loop on said, telephone line and for sending to a caller on the line an outgoing message (OGM) and means for storing said OGM in a native language, characterized in that said telephone answering device further includes language translating means for translating said OGM in said native language into, selectively, a plurality of different languages; means for receiving a control signal from said caller designating a desired one of said plurality of different languages and means responsive to said control signal for sending said OGM, translated into said desired one of said plurality of different languages, to said caller.

2. A telephone answering device adapted to be coupled to a telephone line and to a telephone, including means responsive to an incoming telephone call for closing a loop in said telephone line and for sending to a caller on the line an outgoing message (OGM) in a native language, means for translating said OGM from the native language selectively to a plurality of different languages, means for receiving a control signal from said caller designating a desired one of said plurality of different foreign languages and means responsive to said control signal for sending said OGM in the desired one of said plurality of different languages, to said caller.

3. A method of operating a telephone answering device adapted to be coupled to a telephone line and to a telephone and including means responsive to an incoming call for sending to a caller on the line an outgoing message (OGM), comprising the steps of:

storing a translator program for translating the OGM from the native language into any one of a plurality of different languages;

in response to an incoming call, sending the OGM in the native language to the caller;
receiving from the caller a control signal indicative of a desired language;
in response to said control signal executing said translator program to translate said OGM from said native language into the desired language; and
transmitting said OGM in the desired language to the caller.

* * * * *